United States Patent
Ganesh et al.

(10) Patent No.: US 8,961,144 B2
(45) Date of Patent: Feb. 24, 2015

(54) TURBINE DISK PREFORM, WELDED TURBINE ROTOR MADE THEREWITH AND METHODS OF MAKING THE SAME

(75) Inventors: Swami Ganesh, Clifton Park, NY (US); Steven Louis Breitenbach, Scotia, NY (US); Robin Carl Schwant, Pattersonville, NY (US)

(73) Assignee: General Electric Company, Schenectady, NY (US)

( * ) Notice: Subject to any disclaimer, the term of this patent is extended or adjusted under 35 U.S.C. 154(b) by 672 days.

(21) Appl. No.: 13/172,943

(22) Filed: Jun. 30, 2011

(65) Prior Publication Data

US 2013/0004317 A1    Jan. 3, 2013

(51) Int. Cl.
*F01D 5/06*    (2006.01)

(52) U.S. Cl.
CPC ........... *F01D 5/063* (2013.01); *B23K 2201/001* (2013.01)
USPC .................................. 416/244 A; 219/137 R

(58) Field of Classification Search
CPC ............ F01D 5/02; F01D 5/06; F01D 5/063; B23K 2201/001
USPC .......... 416/244 R, 244 A, 213 R, 216, 241 R; 29/889.2, 889.21, 889.23; 219/76.1, 219/76.12, 76.14, 137.7, 137.71, 137 R
See application file for complete search history.

(56) References Cited

U.S. PATENT DOCUMENTS

| | | | | |
|---|---|---|---|---|
| 2,174,380 A | * | 9/1939 | Doran | 29/889.2 |
| 2,317,092 A | * | 4/1943 | Allen | 415/198.1 |
| 2,479,039 A | * | 8/1949 | Cronstedt | 416/204 R |
| 2,761,047 A | * | 8/1956 | Meredith | 219/118 |
| 3,559,277 A | * | 2/1971 | Marianeschi | 228/173.1 |
| 3,652,823 A | * | 3/1972 | Clemens et al. | 219/137.7 |
| 3,762,913 A | | 10/1973 | Boyko et al. | |
| 3,876,335 A | * | 4/1975 | Forcinal et al. | 416/198 R |
| 3,906,730 A | * | 9/1975 | Bellati et al. | 60/657 |
| 3,967,919 A | * | 7/1976 | Coulon et al. | 416/198 A |
| 4,060,883 A | * | 12/1977 | Coulon et al. | 29/889.2 |
| 4,224,267 A | | 9/1980 | Lugosi et al. | |
| 4,485,960 A | | 12/1984 | Sagan et al. | |
| 4,633,554 A | * | 1/1987 | Clark et al. | 29/888 |
| 4,737,612 A | | 4/1988 | Bruck et al. | |

(Continued)

FOREIGN PATENT DOCUMENTS

| | | |
|---|---|---|
| EP | 0202793 A2 | 11/1986 |
| JP | 03071977 A | 3/1991 |

(Continued)

*Primary Examiner* — Nathaniel Wiehe
*Assistant Examiner* — Eldon Brockman
(74) *Attorney, Agent, or Firm* — Cantor Colburn LLP

(57) ABSTRACT

A method of making a turbine rotor is disclosed. The method includes forming a last stage disk preform having a disk axis, the preform having a rotor face and an opposed shaft face, the rotor face having a circumferential, axially-extending rotor rib protruding therefrom, the shaft face having a circumferential, axially-extending shaft rib protruding therefrom, the disk preform comprising a disk preform material. The method also includes joining the rotor rib to a rotor preform to form a rotor joint, the rotor preform comprising a rotor preform material. The method further includes joining the shaft rib to a shaft to form a shaft joint, the shaft comprising a shaft material, wherein the disk preform material is different than the rotor preform material and the shaft material.

13 Claims, 3 Drawing Sheets

(56) References Cited

U.S. PATENT DOCUMENTS

| | | | |
|---|---|---|---|
| 4,897,519 A | | 1/1990 | Clark et al. |
| 4,962,586 A | * | 10/1990 | Clark et al. .................. 29/889.2 |
| 5,024,582 A | | 6/1991 | Bellows et al. |
| 5,085,363 A | | 2/1992 | Sims |
| 5,397,653 A | | 3/1995 | Clark et al. |
| 5,704,765 A | | 1/1998 | Amos et al. |
| 5,823,745 A | * | 10/1998 | Anderson et al. ......... 416/213 R |
| 6,022,194 A | | 2/2000 | Amos et al. |
| 6,152,697 A | * | 11/2000 | Konishi et al. ............ 416/213 R |
| 6,454,531 B1 | * | 9/2002 | Crawmer .................... 415/198.1 |
| 6,499,946 B1 | * | 12/2002 | Yamada et al. ............ 415/199.4 |
| 6,971,850 B2 | * | 12/2005 | Ganesh et al. ............. 415/216.1 |
| 7,624,909 B2 | * | 12/2009 | Bartsch et al. ................ 228/225 |
| 7,674,090 B2 | * | 3/2010 | Roberts et al. ..................... 416/1 |
| 8,177,516 B2 | * | 5/2012 | Moors et al. ............... 416/244 A |
| 8,414,267 B2 | * | 4/2013 | Ganesh et al. ............ 416/213 R |
| 8,485,788 B2 | * | 7/2013 | Arikawa et al. ........... 416/244 A |
| 2003/0136811 A1 | | 7/2003 | Philip |
| 2005/0072830 A1 | | 4/2005 | Ditzel et al. |
| 2006/0231531 A1 | * | 10/2006 | Burnett et al. ........... 219/121.14 |
| 2010/0059485 A1 | * | 3/2010 | Hutchison et al. ............... 219/74 |
| 2010/0247324 A1 | * | 9/2010 | Sato et al. ................. 416/241 R |
| 2011/0229339 A1 | * | 9/2011 | Yamada et al. ........... 416/244 R |
| 2012/0152921 A1 | * | 6/2012 | Peters et al. ................ 219/130.1 |

FOREIGN PATENT DOCUMENTS

| | | |
|---|---|---|
| WO | 0032350 | 6/2000 |
| WO | 03097287 A1 | 11/2003 |

* cited by examiner

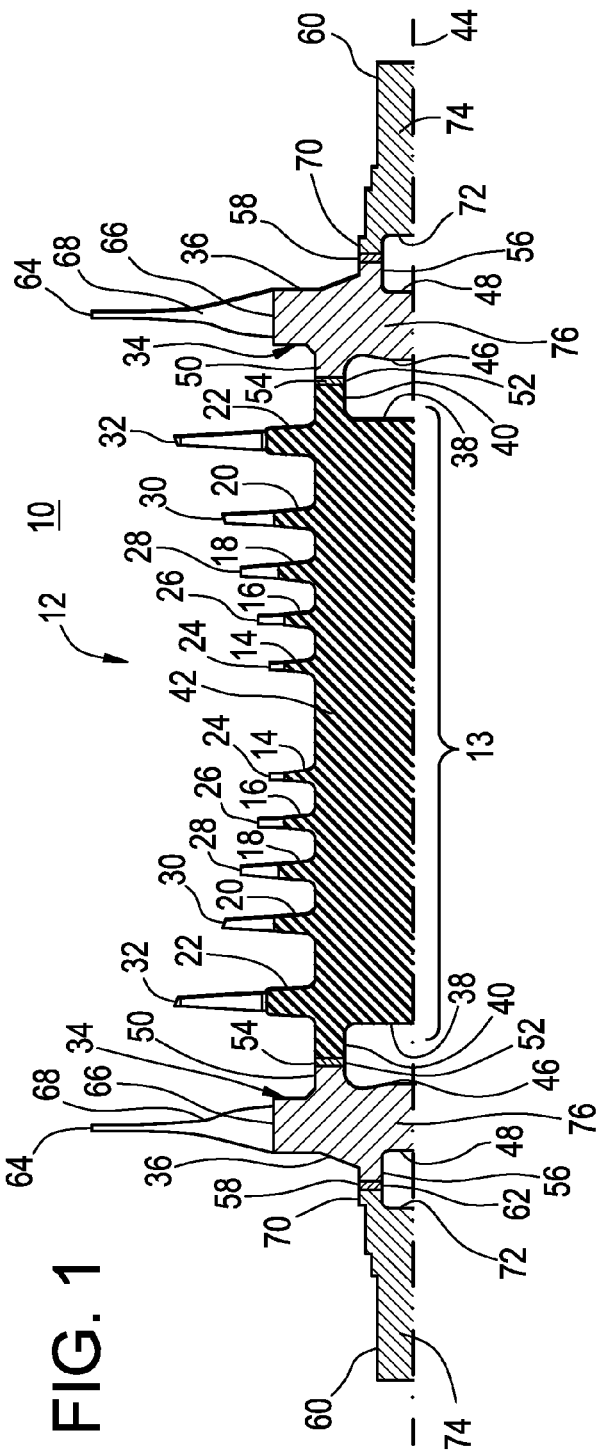
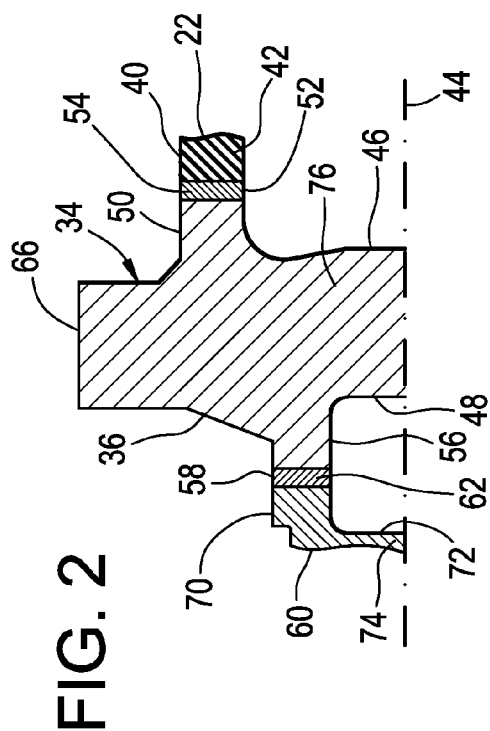

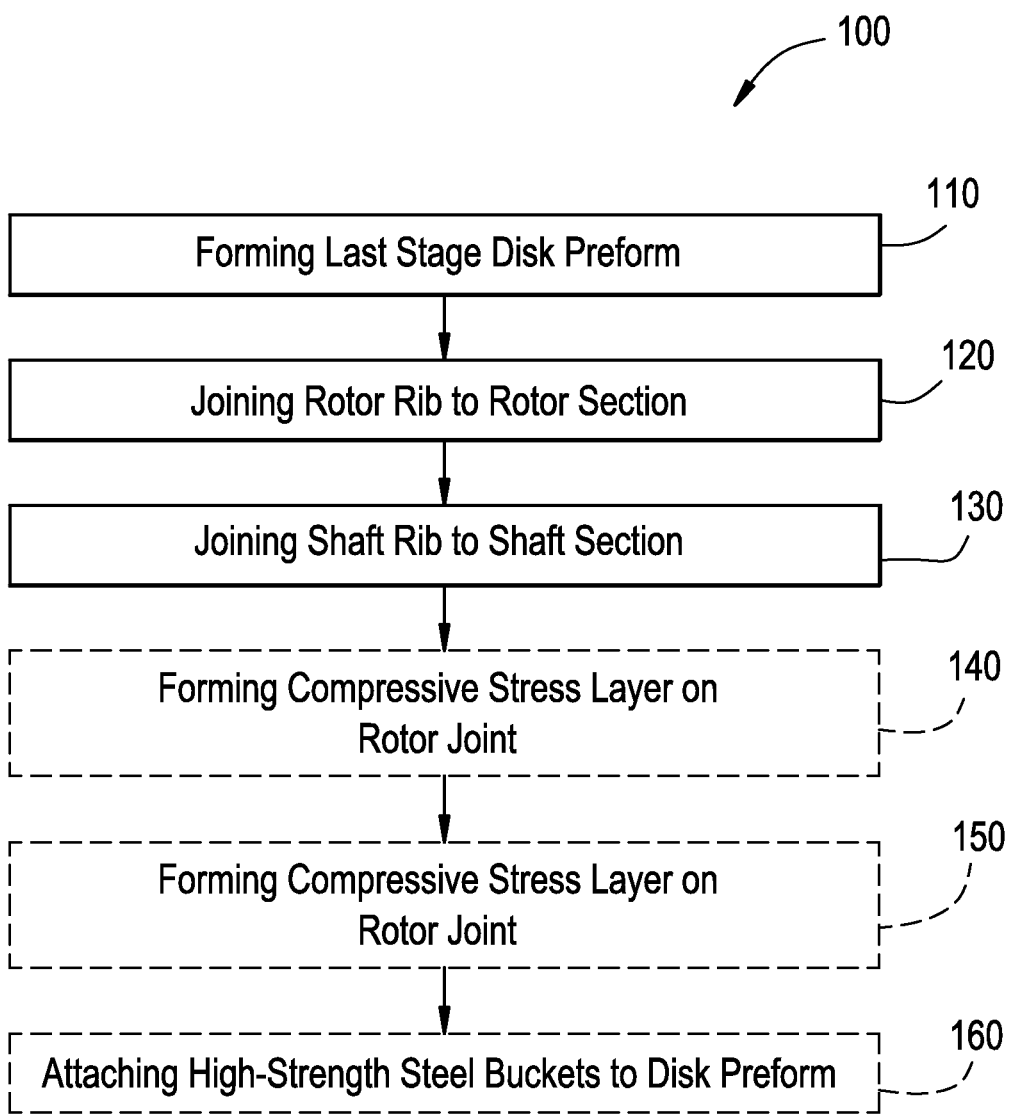

TURBINE DISK PREFORM, WELDED TURBINE ROTOR MADE THEREWITH AND METHODS OF MAKING THE SAME

BACKGROUND OF THE INVENTION

Industrial turbines, particularly steam turbines, convert the energy of a hot gas, such as steam, to rotary mechanical energy by employing turbine buckets disposed around the periphery of a rotor in a series of turbine stages as is well known. In order to improve the conversion efficiency of the turbine, it is desirable to increase the length of the buckets in the various stages of the turbine. In order to increase the length of the buckets, particularly at the last or "L-0" stage of the turbine, it has generally been necessary to employ lightweight materials, such as titanium, in order to avoid having to make significant changes in the rotor alloys, which are typically NiCrMoV steel alloys, because the use of heavier bucket materials, such as high strength steels, in long bucket configurations generally create stresses that exceed the operating limits of these rotor alloys. While the use of higher strength materials in the turbine rotors is possible, it has generally been undesirable because the higher strength materials typically have a significantly higher cost both for the alloy materials themselves and the processes needed to fabricate rotors from these materials.

Therefore, it is desirable to develop turbines that are configured to employ high strength steel buckets in the last turbine stage without necessitating a change in the NiCrMoV steel alloys typically used to form the turbine rotors.

BRIEF DESCRIPTION OF THE INVENTION

According to one aspect of the invention, a method of making a turbine rotor is disclosed. The method includes forming a last stage disk preform having a disk axis, the preform having a rotor face and an opposed shaft face, the rotor face having a circumferential, axially-extending rotor rib protruding therefrom, the shaft face having a circumferential, axially-extending shaft rib protruding therefrom, the disk preform comprising a disk preform material. The method also includes joining the rotor rib to the rotor preform to form a rotor joint, the rotor preform comprising a rotor preform material that has a lower strength than the disk preform material. The method further includes joining the shaft rib to the shaft to form a shaft joint, the shaft comprising a shaft material, wherein the preform material is different than the rotor preform material and the shaft material.

According to another aspect of the invention, a last stage disk preform for a turbine is disclosed. The last stage disk preform has a disk axis. The preform also has a rotor face and an opposed shaft face, the rotor face having a circumferential, axially-extending rotor rib protruding therefrom configured for forming a rotor joint, the shaft face having a circumferential, axially-extending shaft rib protruding therefrom configured for forming a shaft joint. The disk preform comprises a disk preform material.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic sectional illustration of a turbine including a turbine rotor and shaft joined by a last stage turbine disk preform as disclosed herein;

FIG. 2 is a schematic cross-sectional view of a last stage disk preform as disclosed herein;

FIG. 3 is a flow chart illustrating an exemplary embodiment of a method of making a turbine rotor as disclosed herein;

Figure 4:
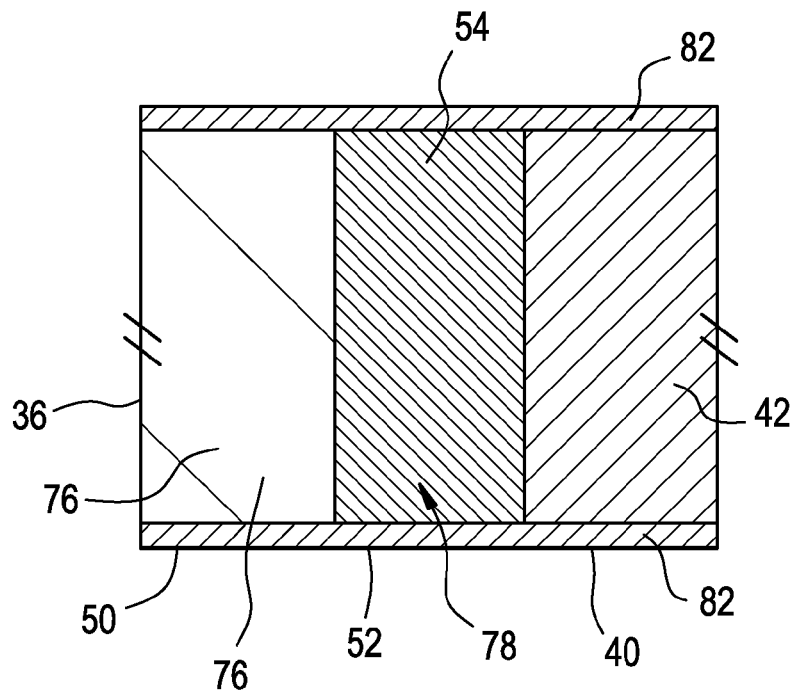
FIG. 4 is a schematic cross-sectional illustration of an exemplary embodiment of a rotor joint as disclosed herein.

The detailed description explains embodiments of the invention, together with advantages and features, by way of example with reference to the drawings.

DETAILED DESCRIPTION OF THE INVENTION

Referring to FIGS. 1-5, a turbine 10 having a welded, dissimilar alloy low pressure (LP) rotor 12 is disclosed. The LP rotor 12 comprises a last stage (L-0) disk 34 made using a disk preform 36 made of a high alloy, high strength, steel, such as various martensitic steels, which is welded to a rotor preform 13 that may include a NiCrMoV low alloy steel disk 22 or rotor segment. This rotor 12 construction advantageously enables the replacement of titanium last stage buckets with lower cost, high strength steel buckets 64. This provides significant cost savings in manufacturing and also enables the use of high strength steel buckets 64 in the last turbine stage having a longer length than those currently employed in this application, including those having a length of about 40 to about 80 inches, which increase the operating efficiency and expand the design flexibility of the turbine 10. While this rotor 12 construction enables the use of longer steel buckets, it also advantageously expands the sizes of titanium buckets that may be used in the last turbine stage to greater than about 80 inches, further expanding the design flexibility of the turbine 10. The welded dissimilar alloy LP rotor 12 disclosed may be manufactured by producing a forged, heat treated and machined L-0 stage preform 36 from a high alloy, high strength, steel, and then welding the disk preform 36 to a NiCrMoV steel rotor preform 13, which may comprise a single turbine stage or multiple turbine stages, on one face as well as welding the other face to an shaft or journal 60, which may also include an NiCrMoV steel alloy. The welding processes used may include any known wire welding process, including tungsten inert gas (TIG), metal inert gas (MIG), sub-arc and electron beam (EB) welding processes, and may utilize cold wire, hot wire, or both, welding techniques. Further, welding may be accomplished using either a single wire or dual wire welding process. A single wire material may be either a low alloy steel of various strength levels compatible with the NiCrMoV steel rotor or shaft 60, or may comprise a high alloy, high strength, steel compatible with the high alloy, high strength L-0 disk preform material 76. A dual wire process may utilize both weld wire types, i.e. low alloy steel and high alloy steel, wherein the lower strength, low alloy wire may be melted on the low alloy steel joint face while the high alloy, high strength wire may be melted against the high alloy, high strength material of the disk preform material 76. The two wire method described offers the advantage of avoiding a sharp chemistry gradient across the weld. The weld wire used may also be one of intermediate chemistry between the NiCrMoV low alloy steel rotor material 42 and the high alloy, high strength steel disk preform material 76. The high alloy, high strength steel disk preform 36 can be welded in a fully heat treated and hardened condition or in a solution annealed condition followed by a post-weld aging heat treatment, or may be welded in the as-forged condition followed by post-weld solution and aging heat treatments. The post-weld stress relief treatment may be performed in a furnace or via localized heating, such as, for example, induction heating. The finished weld joints joining the high alloy, high strength steel disk preform to the rotor 12 or shaft 60 may be further protected by imparting a relatively deep compressive stress layers in their surfaces by processes such as shot peening, roller burnishing or the like.

Referring to FIGS. 1 and 2, a turbine 10 having a welded, dissimilar metal rotor 12 is disclosed. The rotor 12 may be utilized in any type of turbine engine, and is particularly well suited for use in a power generation turbine, such as a steam turbine. Turbine 10 may have any suitable single turbine configuration, or may have a twin turbine configuration as illustrated in FIG. 1 having two last stage rotor disk preforms 36 joined at opposing ends of a common rotor preform 13. Rotor preform 13 may comprise a single-piece rotor or may comprise an assembly of a plurality of disk sections, such as disk sections 14, 16, 18, 20, 22 that are assembled together to one another to form rotor preform 13, and which define a plurality of turbine stages. Upon incorporation into rotor 12, rotor preform 13 is adapted to receive a plurality of circumferentially spaced buckets, such as buckets 24, 26, 28, 30, 32 that are disposed on disk or rotor sections 14, 16, 18, 20, 22, respectively, associated with the various turbine stages and disk segments. Rotor 12 also includes a last stage (L-0) disk 34 that is formed from a disk preform 36 that is welded to an end 38 of rotor preform 13. Rotor disk preform 36 may be joined to rotor preform 13 by any suitable mechanical joint, including by welding disk preform 36 to an annular protruding rib 40 that protrudes from the end 38 of the rotor preform 13. Rotor preform 13 may be formed from any suitable rotor material 42. Rotor material 42 may include various grades of steel, particularly various grades of NiCrMoV steel, such as, for example, a 3.5% NiCrMoV steel as is frequently used as rotor material 42, and more particularly including the 3.5% NiCrMoV steel compositions described in Table 1.

Referring to FIG. 2, the last stage disk preform 36 has a disk axis 44 that corresponds to longitudinal axis 44 of rotor 12. Disk preform 36 comprises a cylindrical disk. Disk preform 36 has a rotor face 46 that faces rotor 12 and an opposed shaft face 48 which faces away from rotor preform 13 and toward shaft 60. The rotor face 46 has a circumferential, axially-extending rotor rib 50 protruding from the rotor face 46. Rotor rib 50 is configured; for example, to be aligned with an annular end rib 40 extending from the end 38 of rotor preform 13 so that a rotor joint 52 may be formed between them. Rotor joint 52 may comprises any suitable mechanical joint between rotor preform 13 and disk preform 36, and is particularly suited to be formed as a rotor weld joint 54 joining rotor preform 13 and rotor disk preform 36. The shaft face 50 has a circumferential, axially-extending shaft rib 56 protruding therefrom. Shaft rib 56 is configured for forming a shaft joint 58 to an shaft 60. Shaft joint 58 may be any suitable mechanical joint for joining disk preform 36 and shaft 60, and is particularly well suited to be formed as a shaft weld joint 62 formed by welding shaft rib 56 to shaft 60, and particularly to a circumferential, axially extending annular rib 70 protruding from an end 72 of shaft 60. Rotor disk preform 36 is configured to receive a plurality of circumferentially spaced buckets 64 disposed about its periphery 66. Bucket 64 may include any steel buckets 68 formed from suitable high strength steel bucket materials.

Rotor disk preform 36 may be made from any suitable disk preform material 76. Suitable materials include various grades of high strength steel, particularly high strength steels, including martensitic steels, having a tensile strength greater than that of rotor material 42. In one exemplary embodiment, rotor disk preform material 76 may include various grades of precipitation hardened steels, such as 17-4PH, 17-7PH and A286, or a maraging steel, as described in Table 1.

Shaft 60 may have any suitable size and shape and may include a circumferentially, axially-extending shaft rib 70 disposed on an end 72 facing rotor disk preform 36. Shaft 60 may be formed from any suitable shaft material 74, and more particularly may be formed from same material as rotor material 42, including various grades of steel, and more particularly various NiCrMoV steels.

Referring to FIGS. 1-3, the turbine rotor 12 may be made by a method 100 that involves welding a dissimilar alloy, last stage rotor disk preform 36 to an end 38 of rotor preform 13. The method 100 includes: forming 110 a last stage disk preform 36 having a disk axis 44, the disk preform 36 having a rotor face 46 and an opposed shaft face 48, the rotor face 46 having a circumferential, axially-extending rotor rib 50 protruding therefrom, the shaft face 48 having a circumferential, axially-extending shaft rib 56 protruding therefrom, the disk preform 36 comprising a disk preform material 76; joining 120 the rotor rib 50 to a rotor preform 13, such as at disk section 22, to form a rotor joint 52, the rotor preform 13 comprising a rotor preform material 42; and joining 130 the shaft rib 56 to a shaft 60 to form a shaft joint 58, the shaft 60 comprising a shaft material 74, wherein the disk preform material 76 is different than the rotor preform material 42 and the shaft material 74.

Forming 110 a last stage disk preform 36 may be performed by any suitable forming method, such as forging the disk preform 36 to an as-forged condition prior to joining the rotor rib 50 to the rotor preform 13 or joining the shaft rib 56 to the shaft 60. The as-forged condition may be a near-net shape, or may be a shape that may otherwise be formed to a final shape by various finishing operations, such as machining, grinding and the like. The as-forged condition refers to a condition of the forged microstructure prior to heat treatment

TABLE 1

| Element | Rotor Materials NiCrMo V Steel (wt. %) 3.5 Ni | Rotor Disk Preform Materials | | | Maraging Steel (wt. %) |
|---|---|---|---|---|---|
| | | High Strength Steels (wt. %) | | | |
| | | 17-4 PH | 17-7PH | A-286 | |
| C | 0.20-0.35 | 0.07 | 0.09 | 0.04 | |
| Mn | 0.2-0.05 | 1.00 | 1.00 | 0.20 | |
| Si | 0.02-0.5 | 1.00 | 1.00 | 0.20 | |
| S | residual | 0.03 | 0.03 | 0.002 | |
| Ni | 3.0-4.0 | 3.0-5.0 | 6.5-7.75 | 25.0 | 17%-19% |
| Cr | 1.50-3.00 | 15.5-17.5 | 16.0-18.0 | 14.5 | |
| Mo | 0.42-0.80 | — | — | 1.25 | 3%-5% |
| V | 0.01-0.4 | — | — | 0.30 | |
| P | residual | 0.04 | 0.04 | 0.15 | |
| Al | 0.02 max | — | 0.75-1.5 | 0.15 | |
| Sn | residual | — | — | — | |
| As | residual | — | — | — | |
| Sb | residual | — | — | — | |
| Nb + Ta | — | 0.15-0.45 | — | — | |
| Cu | — | 3.0-5.0 | — | — | |
| Ti | — | — | — | 2.10 | 1.6% |
| B | — | — | — | 0.006 | |
| Co | | | | | 8%-12% |
| Fe | Balance | Balance | Balance | Balance | Balance | operations to achieve final metallurgical and mechanical properties and relieve the stress introduced into the microstructure by the forging operation through a solution heat treatment or harden the microstructure by aging or precipitation heat treatment. The rotor rib 50, shaft rib 56, or both, may be formed during forming 110, either by forging or by subsequent finishing operations as described herein. Joining 120 of the rotor rib 50 and joining 130 of the shaft rib 56 may be performed while the rotor disk preform 36 is in the as-forged condition or after the preform has been heat treated to obtain the final mechanical and metallurgical properties. The heat treatments described herein, including both the solution heat treatment and aging heat treatment, may be performed by any suitable heat treatment method, including placing the components described, such as the disk preform 36, rotor joint 52 or shaft joint 58 in a suitable furnace or by localized heating, such as induction heating, for example.

In one embodiment of method 100, forming 110 includes forging the disk preform 36 to an as-forged condition prior to joining the rotor rib 50 to the rotor preform 13 or joining the shaft rib 56 to the shaft 60. In this embodiment, the method 100 further comprises, after joining 120 the rotor rib 50 to the rotor preform and joining 130 the shaft rib 56 to the shaft 60, solution heat treatment of the disk preform 36, rotor joint 52 and shaft joint 58 followed by an aging heat treatment of the disk preform 36, rotor joint 52 and shaft joint 58.

In another embodiment of method 100, forming 100 includes forging the disk preform 36 to provide an as-forged disk preform, solution annealing the as-forged disk preform to provide a solution-annealed disk preform and aging the solution-annealed disk preform to provide an aged and hardened disk preform prior to joining 120 the rotor rib 50 to the rotor preform 13 or joining 120 the shaft rib 56 to the shaft 60. In this embodiment, the method 100 further comprises, after joining 120 the rotor rib 50 to the rotor preform 13 and joining 130 the shaft rib 56 to the shaft 60, performing an aging heat treatment of the disk preform 36, rotor joint 52 and shaft joint 58.

In yet another embodiment of method 100, forming 110 comprises forging the disk preform 36 to provide an as-forged disk preform and solution annealing the as-forged disk preform to provide a solution-annealed disk preform prior to joining the rotor rib to the rotor preform or joining the shaft rib to the shaft section. In this embodiment, the method 100 further comprises, after joining 120 the rotor rib 50 to the rotor preform 13 and joining 130 the shaft rib 56 to the shaft 60, aging heat treatment of the disk preform, rotor joint and shaft joint.

Method 100 may also include attaching 160 a plurality of high-strength steel alloy buckets 64 to a periphery of the disk preform 36 to form rotor 12. Use of dissimilar alloy welded rotor 12 consisting of high alloy, high strength steel of rotor disk preform 36 for the last stage disk would also enable the use of high strength steel buckets 64 instead of conventional titanium last stage buckets. Long high strength steel buckets with specific strength (strength/density) equal to or greater than titanium can be substituted for titanium buckets. However, due to greater density of steel compared to titanium a long solid steel bucket would substantially increase the stresses on the disk preform 36 carrying the long steel bucket. Low alloy NiCrMoV steel rotor material in its commonly used condition will not meet the strength requirements for long steel buckets; therefore, disk preform material 76 is selected to have a higher strength than rotor material 42. In order to meet the combination of high strength, toughness and corrosion resistance required for disk preform 36, disk preform materials may include highly alloyed steels such as precipitation hardening (PH) steels or maraging steels having a strength that is greater than the strength of the steel rotor material, such as low alloy NiCrMoV steel rotor material. However, since it is generally not practical or cost effective to produce a monolithic rotor of such high strength, high alloy steels, the welded construction of rotor 12 disclosed herein uses the high alloy, high strength, steel only for the highly stressed last stage disk, namely, rotor disk preform 36, and lower cost, low alloy NiCrMoV steel materials for the remaining portion of the rotor 12. The buckets 64 used with disk preform 36 may also be made from a high strength steel alloy, including precipitation hardened steel alloys or a maraging steel alloys as disclosed herein.

Joining 120 the rotor rib 50 to the rotor preform 13 to form the rotor joint 52 may include any suitable form of welding, such as TIG, MIG, sub-arc and EB welding processes as disclosed herein, and may utilize cold wire, hot wire, or both, welding techniques. Further, rotor joint welding may be accomplished using either a single wire or dual wire welding process.

In one exemplary embodiment, joining 120 may include single-wire welding using a weld wire comprising the disk preform material 76, the rotor material 42 or a rotor joint material 78 (FIG. 4) having a composition that is intermediate a composition of the disk preform material 76 and a composition of the rotor material 42. As used herein, an intermediate composition will include constituents of one or both of the materials with which it is intermediate, in constituent amounts intermediate those of these materials. Single wire welding using a low alloy steel filler offers the benefits of avoiding a strain singularity for narrow soft layers in the heat affected zone by having the weld zone softer than the base metal and the heat affected zone (HAZ).

In another exemplary embodiment, joining 120 may include double-wire welding using a first weld wire comprising the disk preform material 76 located proximate the disk preform 36 and a second weld wire comprising the rotor preform material 42 located proximate the rotor 22. Double-wire welding is advantageous because it avoids the creation of sharp chemistry gradients and the potential for undesirable metallurgical phases and microstructures by melting the high alloy wire against the similar chemistry high alloy disk joint face and the low alloy steel wire against the low alloy steel joint face.

Joining 130 the shaft rib 56 to the shaft 60 to form the shaft joint 58 may also include any suitable form of welding, such as TIG, MIG, sub-arc and EB welding processes as disclosed herein, and may utilize cold wire, hot wire, or both, welding techniques. Further, shaft joint welding may be accomplished using either a single wire or dual wire welding process.

In one exemplary embodiment, joining 130 single-wire welding using a weld wire comprising the disk preform material 76, the shaft material 74 or a shaft joint material 80 (FIG. 5) having a composition that is intermediate a composition of the disk preform material 76 and a composition of the shaft material 74.

In another exemplary embodiment, joining 130 may include double-wire welding using a first weld wire comprising the disk preform material 76 located proximate the disk preform 36 and a second weld wire comprising the shaft material 74 located proximate the shaft 60.

Figure 5:
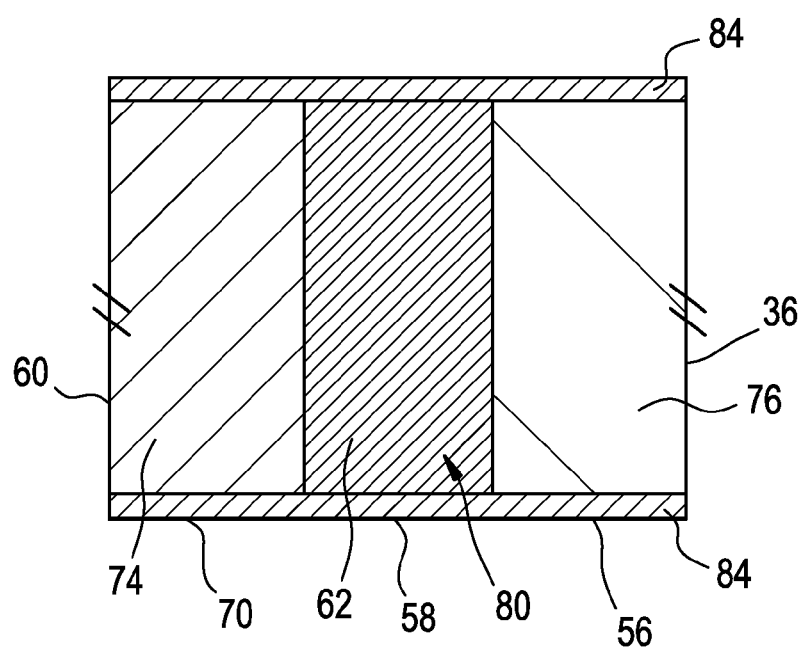
FIG. 5 is a schematic cross-sectional illustration of an exemplary embodiment of a shaft joint as disclosed herein.

As illustrated in FIGS. 3-5, in one embodiment, method 100 may also include forming 140 a compressive stress layer 82 (FIG. 4) on a surface of the rotor joint 52 or forming 150 a compressive stress layer 84 (FIG. 5) on a surface of the shaft joint 58, or both. Forming 140 of compressive stress layer 82 and forming 150 of compressive stress layer 84 may be performed by comprises shot peening or roller burnishing, or a combination thereof.

The dissimilar alloy rotor 12 using a high alloy, high strength steel rotor disk preform 36 according to the method 100 disclosed herein is advantageous in that it allows production of rotors having high alloy, high strength, last stage disks and buckets having sizes that are well above current industry practice by selecting alloys with low sensitivity to cooling rate and improving process conditions via modeling. Method 100 includes welding of dissimilar alloy steels welds having different thermal expansion and mechanical properties. This welding can be performed by improving the weld wire compositions and post-weld heat treatments to provide high damage tolerance and avoid the formation of strain singularities (narrow soft spots). Post-weld heat treatment may be used to achieve desired stress relief and hardness in the weld joints and HAZ without compromising L-0 disk strength, including the use of localized heating, such as induction heating, for post-weld stress relief.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of making a turbine rotor, comprising:
   forming a last stage disk preform configured for attachment to a low pressure end of a turbine rotor preform, the last stage disk preform having a disk axis, the preform having a rotor face and an opposed shaft face, the rotor face having a circumferential, axially-extending rotor rib protruding therefrom, the shaft face having a circumferential, axially-extending shaft rib protruding therefrom, the disk preform comprising a disk preform material, the last stage disk preform comprising the outermost, or L0, disk preform configured to receive turbine buckets on the turbine rotor;
   joining the rotor rib to the end of the rotor preform to form a rotor joint, the rotor preform comprising a rotor preform material, the joining comprising double-wire welding using a first weld wire comprising the disk preform material located proximate the disk preform and a second weld wire comprising the rotor preform material located proximate the rotor preform; and
   joining the shaft rib to a turbine shaft to form a shaft joint, the turbine shaft comprising a shaft material, wherein the disk preform material is different than the rotor preform material and the shaft material.

2. The method of claim 1, further comprising attaching a plurality of high-strength steel alloy buckets to a periphery of the disk preform.

3. The method of claim 2, wherein the steel alloy comprises a precipitation hardened steel alloy or a maraging steel alloy.

4. The method of claim 1, wherein joining the shaft rib to the shaft to form the shaft joint comprises welding.

5. The method of claim 4, wherein welding comprises single-wire welding using a weld wire comprising the disk preform material, the shaft material or a shaft joint material having a composition that is between a composition of the disk preform material and a composition of the shaft material.

6. The method of claim 1, wherein forming comprises forging the disk preform to an as-forged condition prior to joining the rotor rib to the rotor preform or joining the shaft rib to the shaft; and the method further comprises, after joining the rotor rib to the rotor preform and joining the shaft rib to the shaft:
   solution heat treatment of the disk preform, rotor joint and shaft joint; and
   aging heat treatment of the disk preform, rotor joint and shaft joint.

7. The method of claim 1, wherein forming comprises forging the disk preform to provide an as-forged disk preform, solution annealing the as-forged disk preform to provide a solution-annealed disk preform and aging the solution-annealed disk preform to provide an aged and hardened disk preform prior to joining the rotor rib to the rotor preform or joining the shaft rib to the shaft section; and the method further comprises, after joining the rotor rib to the rotor preform and joining the shaft rib to the shaft section:
   aging heat treatment of the disk preform, rotor joint and shaft joint.

8. The method of claim 1, wherein forming comprises forging the disk preform to provide an as-forged disk preform and solution annealing the as-forged disk preform to provide a solution-annealed disk preform prior to joining the rotor rib to the rotor preform or joining the shaft rib to the shaft section; and the method further comprises, after joining the rotor rib to the rotor preform and joining the shaft rib to the shaft section:
   aging heat treatment of the disk preform, rotor joint and shaft joint.

9. The method of claim 1, further comprising:
   forming a compressive stress layer on a surface of the rotor joint; and
   forming a compressive stress layer on a surface of the shaft joint.

10. The method of claim 9, wherein forming a compressive stress layer comprises shot peening or roller burnishing.

11. The method of claim 1, wherein the disk preform material comprises a high strength steel, the rotor preform material comprises a steel alloy having a strength that is lower than a strength of the disk preform material.

12. The method of claim 1, wherein the turbine rotor is a twin turbine rotor having two last stages disk preforms joined at opposing ends of a common rotor, and wherein the method of claim 1 is employed to join one of the disk preforms to one of the opposing ends.

13. A method of making a turbine rotor, comprising:
   forming a last stage disk preform configured for attachment to a low pressure end of a turbine rotor preform, the last stage disk preform having a disk axis, the preform having a rotor face and an opposed shaft face the rotor face having a circumferential axially-extending rotor rib protruding therefrom, the shaft face having a circumferential, axially-extending shaft rib protruding therefrom, the disk preform comprising a disk preform material, the last stage disk preform comprising the outermost, or L0, disk preform configured to receive turbine buckets on the turbine rotor;
   joining the rotor rib to the end of the rotor preform to form a rotor joint, the rotor preform comprising a rotor preform material; and
   joining the shaft rib to a turbine shaft to form a shaft joint, the turbine shaft comprising a shaft material, the joining of the shaft rib comprising double-wire welding using a first weld wire comprising the disk preform material located proximate the disk preform and a second weld wire comprising the shaft material located proximate the shaft, wherein the disk preform material is different than the rotor preform material and the shaft material.

* * * * *